United States Patent
Mason et al.

(10) Patent No.: US 12,403,887 B1
(45) Date of Patent: Sep. 2, 2025

(54) SERIES HYBRID ENGINE CONTROL WITH GEAR EMULATION

(71) Applicant: FCA US LLC, Auburn Hills, MI (US)

(72) Inventors: Barry A Mason, Bradford (CA); Christopher A Tuckfield, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/677,059

(22) Filed: May 29, 2024

(51) Int. Cl.
*B60W 10/06* (2006.01)

(52) U.S. Cl.
CPC ......... *B60W 10/06* (2013.01); *B60W 2520/10* (2013.01); *B60W 2710/0644* (2013.01); *B60W 2710/0666* (2013.01)

(58) Field of Classification Search
CPC ............. B60W 10/06; B60W 2520/10; B60W 2710/0644; B60W 2710/0666
See application file for complete search history.

(56) References Cited

U.S. PATENT DOCUMENTS

| | | | |
|---|---|---|---|
| 12,263,826 B1 * | 4/2025 | Mason | B60W 20/00 |
| 2008/0147284 A1 * | 6/2008 | Tuckfield | B60W 10/06 701/56 |
| 2019/0344780 A1 * | 11/2019 | Ruybal | B60W 20/30 |
| 2022/0169174 A1 * | 6/2022 | Lee | G10K 15/02 |
| 2023/0042527 A1 * | 2/2023 | Jaccoud | B60W 10/06 |

FOREIGN PATENT DOCUMENTS

| | | | | |
|---|---|---|---|---|
| JP | 2010173389 A | * | 8/2010 | |
| JP | 2011085662 A | * | 4/2011 | G10K 15/02 |

\* cited by examiner

*Primary Examiner* — Kevin A Lathers
(74) *Attorney, Agent, or Firm* — Jeremy J. Klobucar

(57) ABSTRACT

A control system that control speed of an internal combustion engine (ICE) in a series hybrid vehicle includes an accelerator pedal, a vehicle speed sensor and a controller. The accelerator pedal sends a torque request signal. The vehicle speed sensor sends a vehicle speed signal. The controller receives the torque request signal and the vehicle speed signal. The controller is configured to determine, based on the torque request and vehicle speed signals, a plurality of allowed emulated gear ratios; calculate an engine speed for each allowed emulated gear ratio; determine a most efficient engine torque for the calculated engine speeds of each allowed emulated gear ratio; select a desired emulated gear ratio having a most efficient operating point from the plurality of allowed emulated gear ratios; and control the ICE to operate at a corresponding engine speed associated with the desired emulated gear ratio.

12 Claims, 6 Drawing Sheets

SERIES HYBRID ENGINE CONTROL WITH GEAR EMULATION

FIELD

The present application generally relates to plug-in hybrid vehicles and, more particularly, to a control system and method for controlling engine speed in a series hybrid vehicle to emulate a fixed gear transmission in a charge sustaining mode.

BACKGROUND

A series hybrid vehicle includes at least one drive motor used to propel the vehicle. The drive motor(s) are coupled to a high voltage battery system and generator through a common high voltage architecture. The generator converts mechanical power from an internal combustion engine (ICE) into electrical power to charge the high voltage battery or power the drive motor(s). Unlike in a parallel hybrid vehicle with a mechanical fixed gear transmission, in a series hybrid vehicle, the engine speed can be operated independently from the vehicle speed by the generator. This can result in the ICE operating at a single constant speed and load or a select few constant speed and load points that are most efficient for a given driver power request. This can lead to noise vibration and harshness (NVH) concerns when the resulting engine power is significantly higher than the driver power request. Accordingly, while such series hybrid vehicles work for their intended purpose, there is a desire for improvement in the relevant art.

SUMMARY

According to one example aspect of the invention, a control system that control speed of an internal combustion engine (ICE) in a series hybrid vehicle includes an accelerator pedal, a vehicle speed sensor and a controller. The accelerator pedal sends a torque request signal. The vehicle speed sensor sends a vehicle speed signal. The controller receives the torque request signal and the vehicle speed signal. The controller is configured to determine, based on the torque request and vehicle speed signals, a plurality of allowed emulated gear ratios; calculate an engine speed for each allowed emulated gear ratio; determine a most efficient engine torque for the calculated engine speeds of each allowed emulated gear ratio; select a desired emulated gear ratio having a most efficient operating point from the plurality of allowed emulated gear ratios; control the ICE to operate at a corresponding engine speed associated with the desired emulated gear ratio.

In some implementations, engine speed is equal to a product of vehicle speed and an allowed emulated gear ratio.

In some implementations, the plurality of allowed emulated gear ratios includes at least five allowed emulated gear ratios each having a range of torque for an associated engine speed.

In some implementations, the controller is configured to determine a plurality of allowed emulated gear ratios based on a determination that the ICE is on.

In some implementations, the controller is configured to operate the ICE at a corresponding engine speed proportional to the vehicle speed signal.

In additional aspects, a generator converts mechanical power from the ICE into electrical power to one of charge a high voltage battery and power the at least one electric drive motor.

According to one example aspect of the invention, a method for controlling a speed of an internal combustion engine (ICE) in a series hybrid vehicle is provided. The method includes receiving, at a controller, a torque request signal and a vehicle speed signal; determining, at the controller and based on the torque request and vehicle speed signals, a plurality of allowed emulated gear ratios; calculating, at the controller, an engine speed for each allowed emulated gear ratio; determining, at the controller, a most efficient engine torque for the calculated engine speeds of each allowed emulated gear ratio; selecting, at the controller, a desired emulated gear ratio having a most efficient operating point from the plurality of allowed emulated gear ratios; and controlling, at the controller, the ICE to operate at a corresponding engine speed associated with the desired emulated gear ratio.

In additional features, engine speed is equal to a product of vehicle speed and an allowed emulated gear ratio.

In additional features, the plurality of allowed emulated gear ratios includes at least five allowed emulated gear ratios each having a range of torque for an associated engine speed.

In other examples, the controller determines a plurality of allowed emulated gear ratios based on a determination that the ICE is on.

In additional features, the controller operates the ICE at a corresponding engine speed proportional to the vehicle speed signal.

In additional features, the series hybrid vehicle further includes a generator that converts mechanical power from the ICE into electrical power to one of charge a high voltage battery and power the at least one electric drive motor.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As mentioned above, in a series hybrid vehicle, the engine speed and load can be operated independently from the vehicle speed by the generator. When a series hybrid vehicle is operating in a charge sustaining mode, the ICE speed and load can operate independently from the vehicle speed and driver power request. This can result in the ICE operating at a single constant speed and load or a select few constant speed and load points that are most efficient for a given driver power request. This can lead to noise vibration and harshness (NVH) concerns when the resulting engine power is significantly higher than the driver power request. Such NVH is most noticeable during low vehicle speed driving where there is less road noise to mask the engine noise. A disconnect sensation can be experienced by the driver between engine sound, driver power request and vehicle speed.

The instant disclosure provides a vehicle control system and control strategy for controlling engine speed in a series hybrid vehicle to emulate a fixed gear transmission in charge sustaining mode. As will be described in detail herein, engine speed is proportional to the current vehicle speed and the selected emulated gear ratio. Multiple emulated gear ratios are available resulting in similar engine operation to a parallel hybrid vehicle with a mechanical fixed gear transmission. This results in the driver perception that the engine speed and resulting noise is connected to the vehicle speed, which is the expected behavior of past drivers of parallel hybrid and conventional powertrain vehicles.

Figure 1:
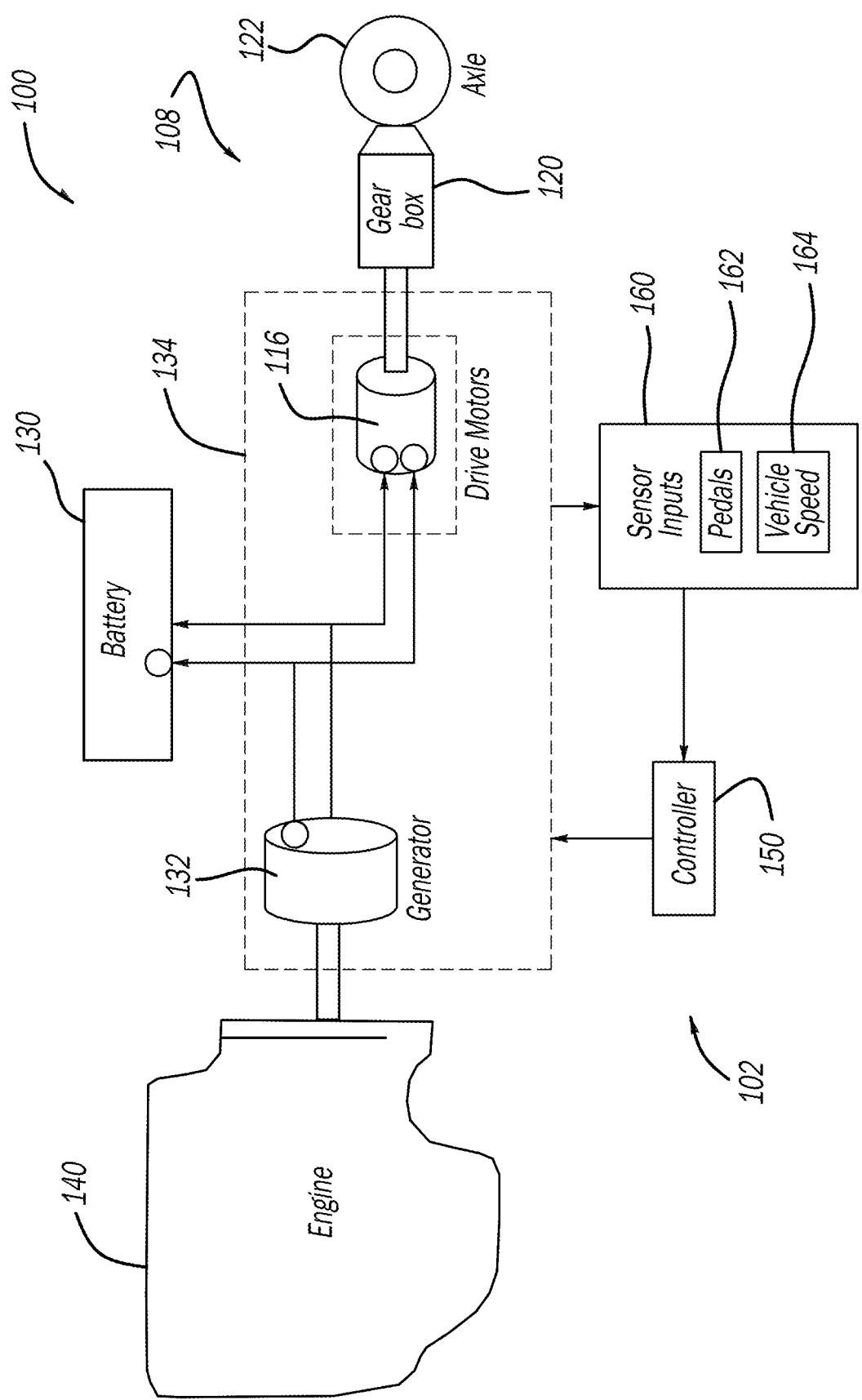
FIG. 1 is a functional block diagram of a series hybrid electric vehicle that implements a control strategy for controlling engine speed according to various principles of the present application.

Referring now to FIG. 1, a functional block diagram of an example series hybrid vehicle 100 (also referred to herein as "vehicle 100") that incorporates a vehicle control system 102 for controlling engine speed according to the principles of the present application is illustrated. The vehicle 100 includes an electrified powertrain 104 having one or more electric drive units or motors 116 (e.g., electric traction motors) configured to generate and transfer drive torque to a driveline 108 for vehicle propulsion. The driveline 108 can include a gearbox 120 and a drive axle 122 that drives drive wheels 124.

The drive motors 116 are used to propel the vehicle 100. The drive motors 116 are coupled to a high voltage battery 130 and a generator 132 through a common high voltage architecture 134. The generator 132 converts mechanical power from an internal combustion engine (ICE) 140 into electrical power to charge the high voltage battery 130 or power the drive motors 116. As identified above, in a series hybrid vehicle (unlike in a parallel hybrid vehicle with a mechanical fixed gear transmission), the engine speed and load can be operated independently from the vehicle speed by the generator 132. In a series hybrid, the ICE 140 does not have a mechanical path to the drive axle 122 (drive wheels). Instead, the only path to produce power at the drive wheels 124 is through the generator 132 to produce electrical power. The electrical power from the generator 132 flows to the battery 130 for charging, and/or to the drive motors 116 for powering the vehicle drive wheels 124.

The vehicle control system 102 includes a controller 150 that receives signals from sensor inputs 160 such as a drive input device, e.g., an accelerator pedal 162, for providing a driver input, e.g., a torque request, to the controller 150 and ultimately to the high voltage architecture 134 and ICE 140.

The sensor inputs 160 can also include a vehicle speed sensor 164 that provides a vehicle speed.

While the vehicle control system 102 is shown as a single controller 150, it will be appreciated that more controllers and/or modules, such as a supervisory electric vehicle control module, a battery control module, a motor control module and a chassis stability module, can be utilized to control various vehicle components of the series hybrid vehicle 100. In this regard, various controllers and modules are configured to communicate with each other, utilizing different sensor inputs 160 and calculated parameters for controlling operation of the vehicle control system 102.

Figure 2:
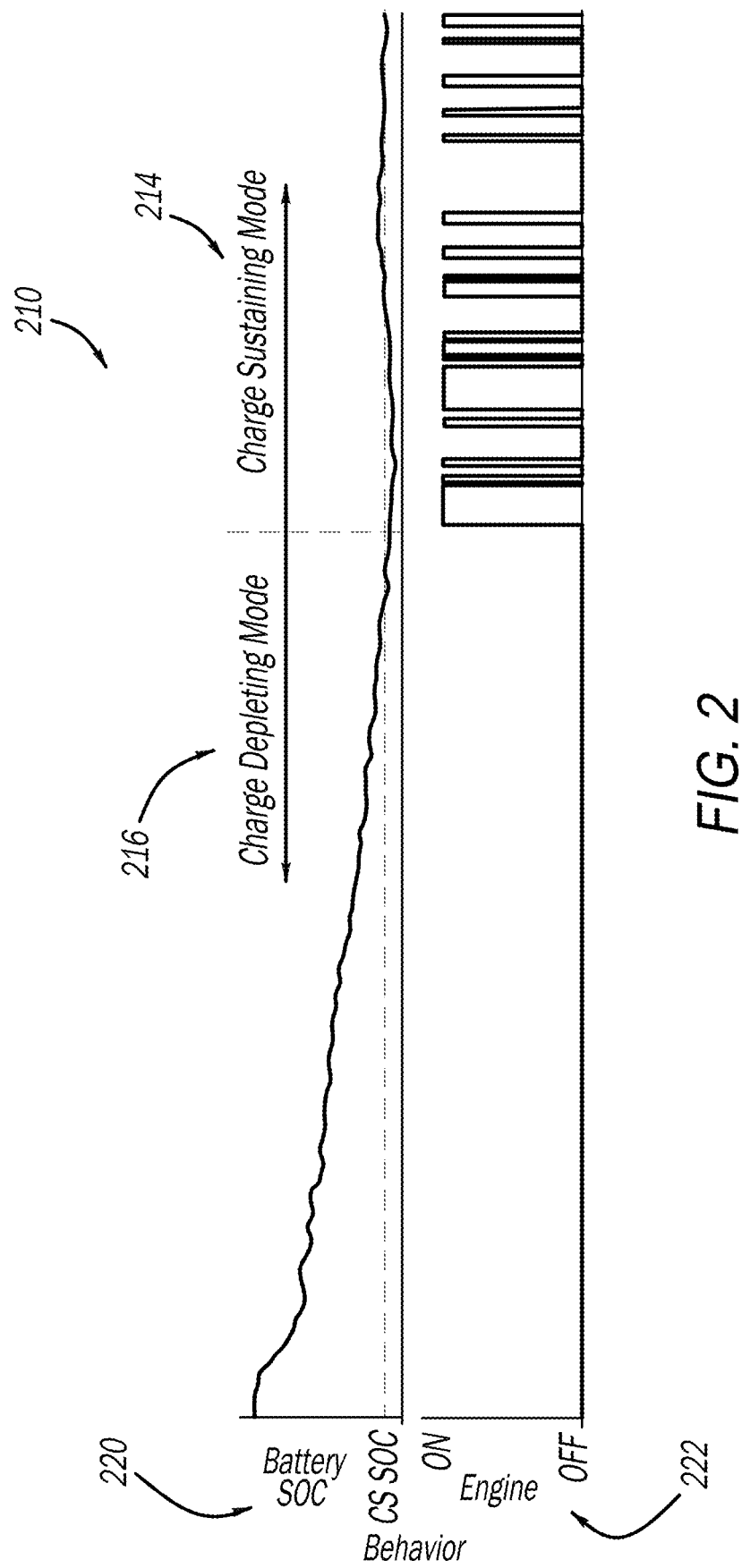
FIG. 2 is a plot illustrating charge sustaining and charge depleting modes showing battery state of charge and engine behavior according to example series hybrid powertrains.

With additional reference now to FIG. 2, a plot 210 illustrating a charge sustaining 214 and a charge depleting mode 216 is shown. A battery state of charge 220 and engine behavior 222 according to example series hybrid powertrains are illustrated. As is known, plug-in hybrid vehicles can operate in a charge depleting mode 216 and a charge sustaining mode 214. In a charge depleting mode 216, the energy from the battery 130 is used primarily (or exclusively) to propel the vehicle 100 such that the battery state of charge decreases. In the charge sustaining mode 214, the fuel energy is used primarily to propel the vehicle 100 so that the battery energy remains approximately constant such that the battery state of charge is maintained. As shown, the ICE 140 starts when energy has been depleted from the battery 130. Furthermore, the ICE 140 runs at optimal times to minimize fuel consumption while maintaining state of charge in a narrow range.

Figure 3:
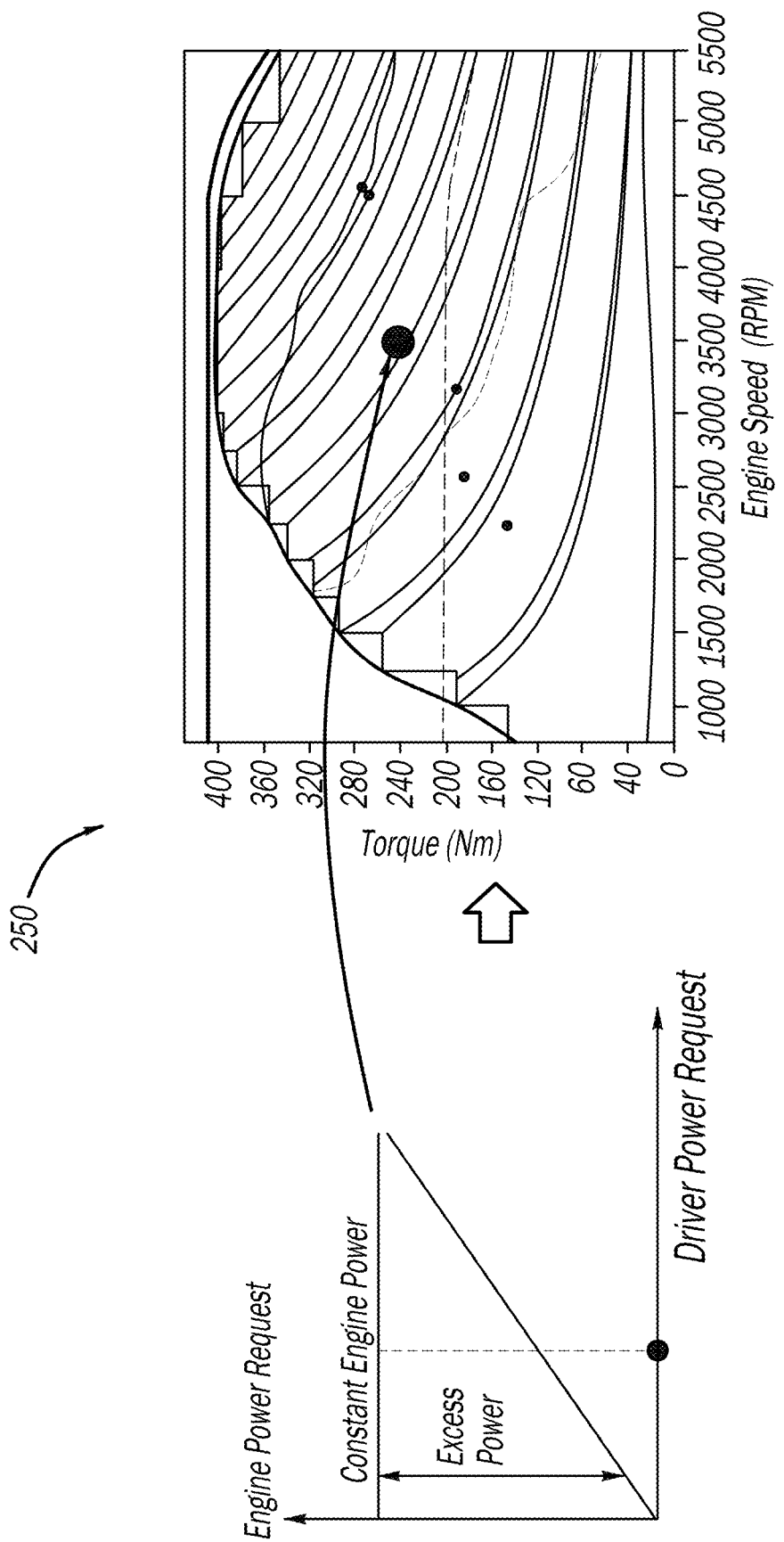
FIG. 3 is a plot illustrating unconstrained series hybrid engine control that results in an engine operating at a constant engine power (constant speed and load) or a select few constant speed and load points that are most efficient for a given driver power request.

Turning now to FIG. 3, a plot 250 illustrating unconstrained series hybrid engine control according to prior art examples that results in an engine operating at a constant engine power (constant speed and load) or a select few constant speed and load points that are most efficient for a given driver power request. Such a strategy can result in the engine producing significantly higher power than the driver power request. As can be appreciated, in some operating conditions, such as driving in a subdivision or other area at low speeds, the engine can be commanded to produce significantly higher power than the driver power request. The condition is undesirable as the sound emanating from the ICE can suggest an unreasonably elevated power output for the given situation. The vehicle control system 102 commands a more appropriate engine power (RPM), and thereby perceived engine sound output for a given situation.

Figure 4:
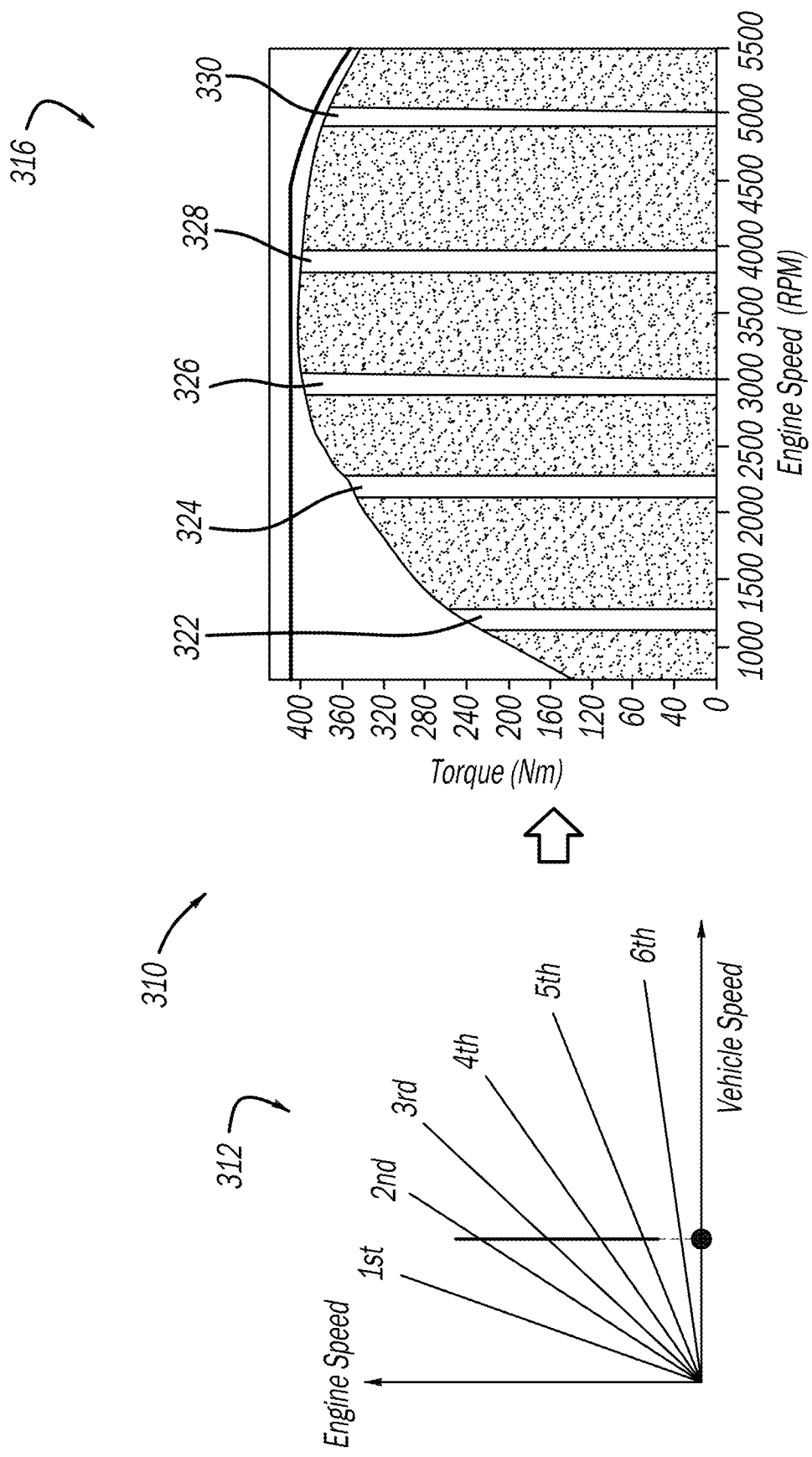
FIG. 4 is a plot illustrating a series hybrid engine control using gear emulation according to examples of the present disclosure.

FIG. 4 is a plot 310 illustrating a series hybrid engine control using gear emulation according to examples of the present disclosure. The series hybrid engine control using gear emulation results in the engine speed being controlled to be proportional to the vehicle speed and the selected emulated gear ratio, which results in the perception that the ICE 140 is mechanically connected to the drive axle 122 (drive wheels) with a fixed gear transmission having gears 312.

The plot 310 includes an emulated gear shift map that is used to "shift" between emulated gears so that the engine 140 can operate more efficiently for the given driver power request. In the example shown, the engine 140 is operated at one of the identified speeds 322, 324, 326, 328 and 330, proportional to vehicle speed. This relationship is more in line with the behavior of a fixed gear transmission where the engine speed is proportional to the wheel speed and current gear. While the gear shift map generally illustrates a bar for each engine speed, it is appreciated that the engine speeds can be alternatively be represented as lines. Further, while an infinite number of gear ratios could be used, the example shown in the plot 310 uses six emulated gear ratios. The series hybrid engine control provides the expected sensation of engine speed increasing with vehicle speed to the driver.

Figure 5:
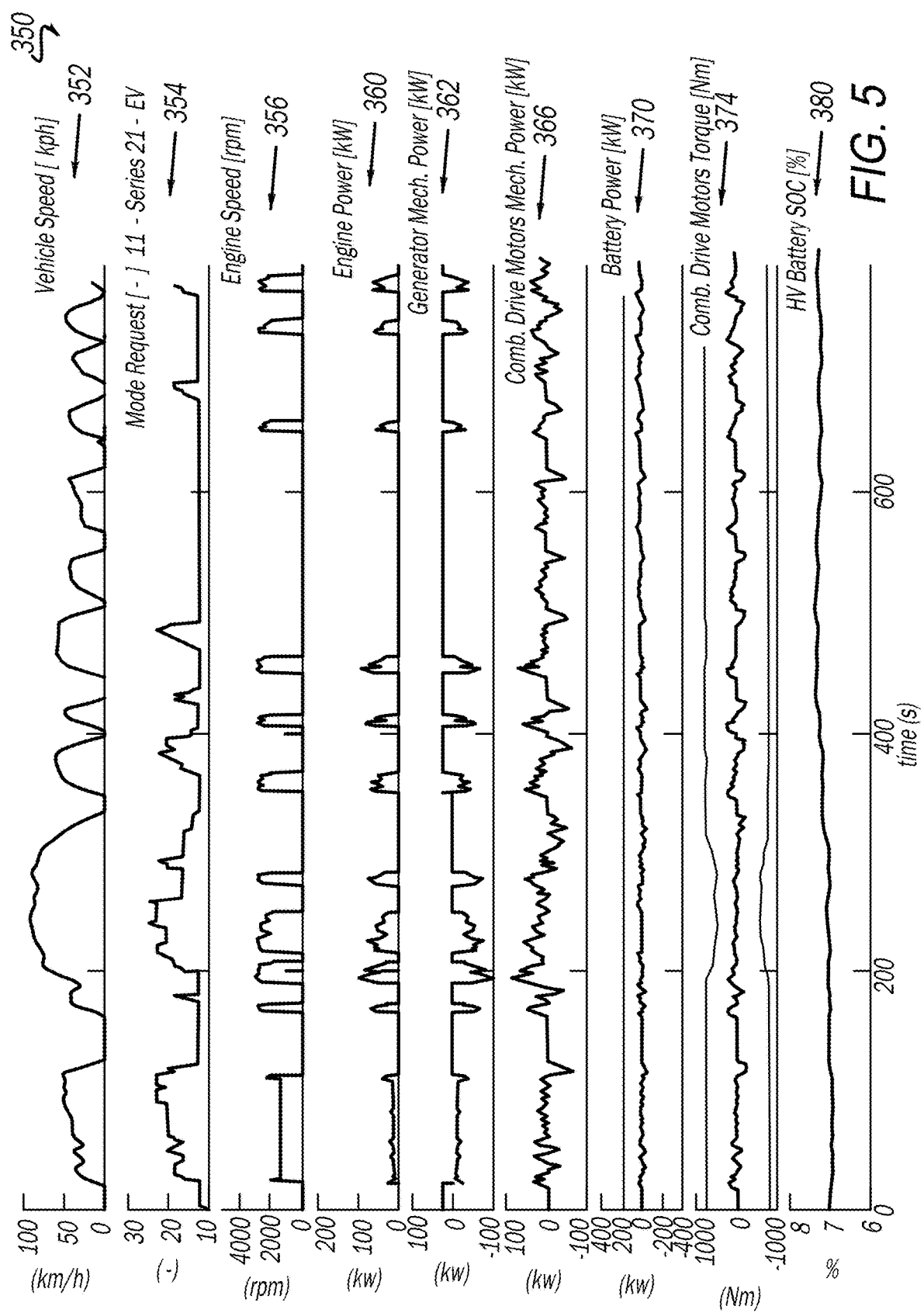
FIG. 5 is a series of plots showing various parameters over time of the series hybrid engine control using gear emulation of FIG. 4.

FIG. 5 is a series of plots 350 showing various parameters over time of the series hybrid engine control using the gear emulation of FIG. 4. The series of plots 350 includes a vehicle speed 352, the emulated gear selected 354, an engine speed 356, an engine power 360, a generator mechanical power 362. A combined drive motors mechanical power 366, a battery power 370, a combined drive motors torque 374 and a high voltage battery state of charge 380. It will be appreciated that the respective values of the plots 350 may be different within the scope of the present disclosure.

Figure 6:
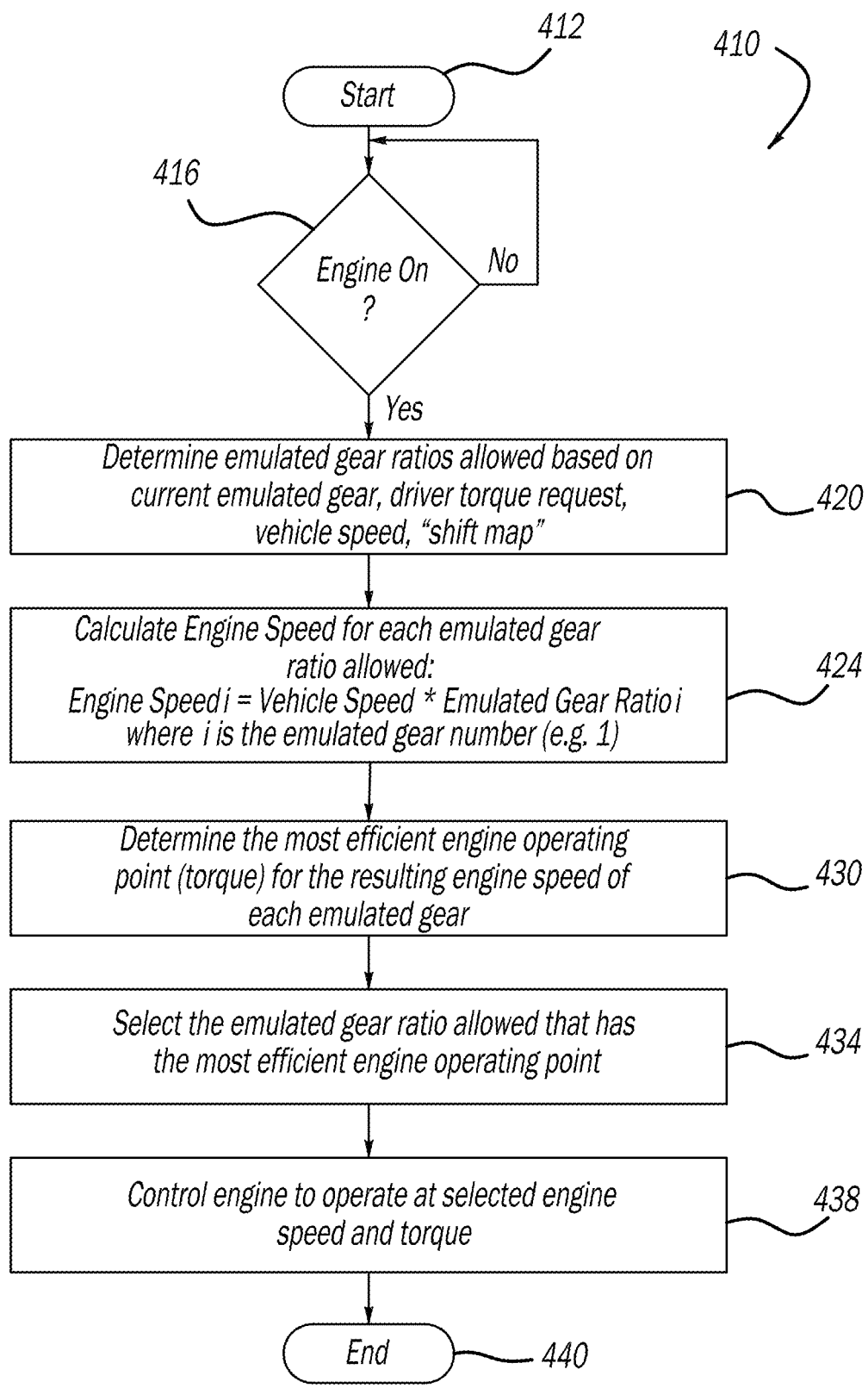
FIG. 6 is a logic flow diagram illustrating a method of controlling the series hybrid engine using gear emulation according to examples of the present disclosure.

Turning now to FIG. 6, a method 410 of controlling the series hybrid engine using gear emulation according to examples of the present disclosure will be described. The method 410 starts at 412. At 416, control determines whether the engine 140 is on. If the engine 140 is not on, control loops to 416. If control determines that the engine 140 is on, at 420 control determines an emulated gear ratio allowed based on a current emulated gear, driver torque request, a vehicle speed and the shift map. At 424, control calculates engine speed for each emulated gear ratio allowed. At 430, control determines the most efficient engine operating point (torque) for the resulting engine speed of each emulated gear.

At 434, control selects the emulated gear ratio allowed that has the most efficient engine operating point. At 438, control operates the ICE 140 at the selected engine speed and torque. Control ends at 440. The method 410 using the gear emulation series hybrid engine control results in the speed of the ICE 140 being controlled to be proportional to the vehicle speed and the selected emulated gear ratio. The emulated gear shift map is used to "shift" between emulated gears so that the ICE 140 can operate more efficiently for a given driver power request. The ICE operates at the most efficient point (engine torque) of the most efficient emulated gear allowed (which determines the engine speed).

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A control system that controls speed of an internal combustion engine (ICE) in a series hybrid vehicle, the control system comprising:
   an accelerator pedal that sends a torque request signal;
   a vehicle speed sensor that sends a vehicle speed signal; and
   a controller that receives the torque request signal and the vehicle speed signal and that is configured to:
      determine, based on the torque request and vehicle speed signals, a plurality of allowed emulated gear ratios;
      calculate an engine speed for each allowed emulated gear ratio;
      determine a most efficient engine torque for the calculated engine speeds of each allowed emulated gear ratio;
      select a desired emulated gear ratio having a most efficient operating point from the plurality of allowed emulated gear ratios; and
      control the ICE to operate at a corresponding engine speed associated with the desired emulated gear ratio.

2. The control system of claim 1, wherein engine speed is equal to a product of vehicle speed and an allowed emulated gear ratio.

3. The control system of claim 1, wherein the plurality of allowed emulated gear ratios includes at least two allowed emulated gear ratios each having a range of torque for an associated engine speed.

4. The control system of claim 3, wherein the controller is configured to determine a plurality of allowed emulated gear ratios based on a determination that the ICE is on.

5. The control system of claim 1, wherein the controller is configured to operate the ICE at a corresponding engine speed proportional to the vehicle speed signal.

6. The control system of claim 1, further comprising a generator that converts mechanical power from the ICE into electrical power to one of charge a high voltage battery and power the at least one electric drive motor.

7. A method for controlling a speed of an internal combustion engine (ICE) in a series hybrid vehicle, the method comprising:
   receiving, at a controller, a torque request signal and a vehicle speed signal;
   determining, at the controller and based on the torque request and vehicle speed signals, a plurality of allowed emulated gear ratios;
   calculating, at the controller, an engine speed for each allowed emulated gear ratio;
   determining, at the controller, a most efficient engine torque for the calculated engine speeds of each allowed emulated gear ratio;
   selecting, at the controller, a desired emulated gear ratio having a most efficient operating point from the plurality of allowed emulated gear ratios; and
   controlling, at the controller, the ICE to operate at a corresponding engine speed associated with the desired emulated gear ratio.

8. The method of claim 7, wherein engine speed is equal to a product of vehicle speed and an allowed emulated gear ratio.

9. The method of claim 7, wherein the plurality of allowed emulated gear ratios includes at least two allowed emulated gear ratios each having a range of torque for an associated engine speed.

10. The method of claim 9, wherein the controller determines a plurality of allowed emulated gear ratios based on a determination that the ICE is on.

11. The method of claim 7, wherein the controller operates the ICE at a corresponding engine speed proportional to the vehicle speed signal.

12. The method of claim 7, wherein the series hybrid vehicle further includes a generator that converts mechanical power from the ICE into electrical power to one of charge a high voltage battery and power the at least one electric drive motor.

\* \* \* \* \*